United States Patent
Su

(10) Patent No.: US 12,373,066 B2
(45) Date of Patent: Jul. 29, 2025

(54) ELECTRONIC DEVICE HAVING CONTROL CHIP FOR DETECTING DIFFERENT TYPES OF TOUCH OBJECTS

(71) Applicant: PIXART IMAGING INC., Hsin-Chu County (TW)

(72) Inventor: Tse-Chung Su, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

(21) Appl. No.: 18/610,277

(22) Filed: Mar. 20, 2024

(65) Prior Publication Data

US 2025/0173025 A1    May 29, 2025

Related U.S. Application Data

(60) Provisional application No. 63/603,135, filed on Nov. 28, 2023.

(51) Int. Cl.
    *G06F 3/041*    (2006.01)
(52) U.S. Cl.
    CPC ................... *G06F 3/04186* (2019.05)

(58) Field of Classification Search
    CPC .......................... G06F 3/1423; G06F 3/04186
    USPC ..................................... 345/1.1, 173
    See application file for complete search history.

(56) References Cited

U.S. PATENT DOCUMENTS

| | | | |
|---|---|---|---|
| 10,691,257 B2 | 6/2020 | Chang et al. | |
| 2014/0022193 A1* | 1/2014 | Kim | G06F 3/03545 345/173 |
| 2014/0022194 A1* | 1/2014 | Ito | G06F 3/04186 345/173 |
| 2014/0055393 A1* | 2/2014 | Chen | G06F 3/04166 345/173 |
| 2022/0391067 A1* | 12/2022 | Chugunov | G06F 3/04166 |

* cited by examiner

*Primary Examiner* — Long D Pham
(74) *Attorney, Agent, or Firm* — HAUPTMAN HAM, LLP

(57) ABSTRACT

The present disclosure provides an electronic device including a touch sensing device, a control chip and a post operation system. The touch sensing device is used to output a detection signal associated with an object. The control chip is used to identify a contact area, a contact position, an operation status of the object according to the detection signal to send a corresponding report packet to the post operation system. When identifying that the contact area changes from a small area to a large area, the control chip actively sends a reset report packet to reset a current operation status to an initial contact.

17 Claims, 6 Drawing Sheets

| Report | ID_obj1 | ID_obj2 |
|---|---|---|
| R0 t0 | position:(X1,Y1)/type:finger/tip:no | |
| R1 t1 | position:(X1,Y1)/type:palm/tip:no | |
| R1' t2 | position:(X1,Y1)/type:palm/tip:yes | position:(X1,Y1)/type:palm/tip:no |
| R2 t3 | | position:(X1,Y1)/type:finger/tip:no |

FIG. 3A

| Report | ID_obj1 | ID_obj2 |
|---|---|---|
| R0 t0 | position:(X1,Y1)/type:finger/tip:no | |
| R1' t1 | position:(X1,Y1)/type:palm/tip:yes | position:(X1,Y1)/type:palm/tip:no |
| R2 t2 | | position:(X1,Y1)/type:finger/tip:no |

FIG. 3B

| Report | ID_obj1 | | ID_obj2 | |
|---|---|---|---|---|
| R0 t₀ | position:(X1,Y1)/type:finger/tip:no | | | |
| R1' t₁ | position:(X1,Y1)/type:finger/tip:yes | | position:(X1,Y1)/type:palm/tip:no | |
| R2 t₂ | | | position:(X1,Y1)/type:finger/tip:no | |

FIG. 3C

| Report | ID_obj1 |
|---|---|
| R0 $t_0$ | position:(X1,Y1)/type:finger/tip:no |
| R1 $t_1$ | position:(X1,Y1)/type:palm/tip:no |
| R1' $t_2$ | position:(X1,Y1)/type:palm/tip:yes |
| R1" $t_3$ | position:(X1,Y1)/type:palm/tip:no |
| R2 $t_4$ | position:(X1,Y1)/type:finger/tip:no |

FIG. 4A

| Report | ID_obj1 |
|---|---|
| R0 $t_0$ | position:(X1,Y1)/type:finger/tip:no |
| R1' $t_1$ | position:(X1,Y1)/type:palm/tip:yes |
| R1" $t_2$ | position:(X1,Y1)/type:palm/tip:no |
| R2 $t_3$ | position:(X1,Y1)/type:finger/tip:no |

FIG. 4B

| Report | ID_obj1 |
|---|---|
| R0 $t_0$ | position:(X1,Y1)/type:finger/tip:no |
| R1' $t_1$ | position:(X1,Y1)/type:finger/tip:yes |
| R1" $t_2$ | position:(X1,Y1)/type:palm/tip:no |
| R2 $t_3$ | position:(X1,Y1)/type:finger/tip:no |

ELECTRONIC DEVICE HAVING CONTROL CHIP FOR DETECTING DIFFERENT TYPES OF TOUCH OBJECTS

CROSS REFERENCE TO RELATED APPLICATION

The present application claims the priority benefit of U.S. Provisional Application Ser. No. 63/603,135, filed on Nov. 28, 2023, the disclosure of which is hereby incorporated by reference herein in its entirety.

BACKGROUND

1. Field of the Disclosure

The present disclosure generally relates to a touch control electronic device and, more particularly, to an electronic device that is able to detect a variation of touch control types to perform different touch control functions corresponding to different touch control types.

2. Description of the Related Art

The precision touchpad (PTP) of Microsoft Corporation may perform different control functions corresponding to whether a finger or a palm is detected thereby. For example, when the precision touchpad detects a finger, the finger may be used to control a cursor movement; whereas, when the precision touchpad detects a palm, the palm may be used to control the screen scrolling operation and the zooming operation, or the detection of a palm may be used to confirm the operation triggered by the finger.

Therefore, how to correctly determine a touch state and a state change on the precision touchpad is important so as not to induce the false operation.

The information disclosed in the Related Art herein is merely intended to increase understanding of the general background of the invention and should not be taken as an admission or in any way implied that the relevant information constitutes prior art that is already known to a person of ordinary skill in the art.

SUMMARY

Accordingly, the present disclosure provides an electronic device that solves the problem of the post operation system not able to accept a successive operation of "Finger→Palm-→Finger" on a touch pad.

The present disclosure provides an electronic device that uses a control chip to actively generate a reset report package for breaking a successive operation of "Finger-→Palm→Finger" to cause the successive operation of "Finger→Palm→Finger" to two segmented operations of "Finger→Palm" and "Palm→Finger".

The present disclosure provides an electronic device including a control chip. The control chip is used to receive a detection signal, identify a first type and a second type of an object on a sensing surface of a touch sensing device according to the detection signal, and send report packets at a report period, and automatically send a reset report packet in response to the object changing from the first type to the second type, the reset report packet comprising a first report packet and a second report packet, the first report packet comprising (a first object ID code, a leaving tip code), and the second report packet comprising (a second object ID code, a non-leaving tip code), wherein the object does not leave the sensing surface of the touch sensing device when the control chip is sending the reset report packet.

The present disclosure further provides an electronic device including a control chip. The control chip is used to receive a detection signal, identify a first type and a second type of an object on a sensing surface of a touch sensing device according to the detection signal, and send report packets at a report period, and automatically send a reset report packet when the object is identified as the second type for a first time, wherein the reset report packet indicates that the object leaves the sensing surface and a second object having the second type touches the sensing surface, wherein the object does not leave the sensing surface of the touch sensing device when the control chip is sending the report packet.

The present disclosure further provides an electronic device including a control chip. The control chip is used to receive a detection signal, identify a first type and a second type of an object on a sensing surface of a touch sensing device according to the detection signal, and send report packets at a report rate, and automatically send a reset report packet to reset the object as an initial contact in response to the object changing from the first type to the second type, the reset report packet comprising a first report packet and a second report packet, the first report packet comprising a leaving tip code, and the second report packet comprising a non-leaving tip code, wherein the object does not leave the sensing surface of the touch sensing device when the control chip is sending the reset report packet.

BRIEF DESCRIPTION OF THE DRAWINGS

Other objects, advantages, and novel features of the present disclosure will become more apparent from the following detailed description when taken in conjunction with the accompanying drawings.

FIG. 3A is an operational schematic diagram of an electronic device according to a first embodiment of the present disclosure.

FIG. 3B is another operational schematic diagram of an electronic device according to a first embodiment of the present disclosure.

FIG. 3C is further operational schematic diagram of an electronic device according to a first embodiment of the present disclosure.

FIG. 4A is an operational schematic diagram of an electronic device according to a second embodiment of the present disclosure.

FIG. 4B is another operational schematic diagram of an electronic device according to a second embodiment of the present disclosure.

DETAILED DESCRIPTION OF THE EMBODIMENT

It should be noted that, wherever possible, the same reference numbers will be used throughout the drawings to refer to the same or like parts.

One objective of the present disclosure is to provide an electronic device that resets data of a report packet when a touch type on a surface of a touch panel has a first change to cause a second change of the touch type to be treated as an initial type change so as to eliminate the problem of a successive variation of the touch type is not acceptable by an operation system of the electronic device.

Figure 1A:
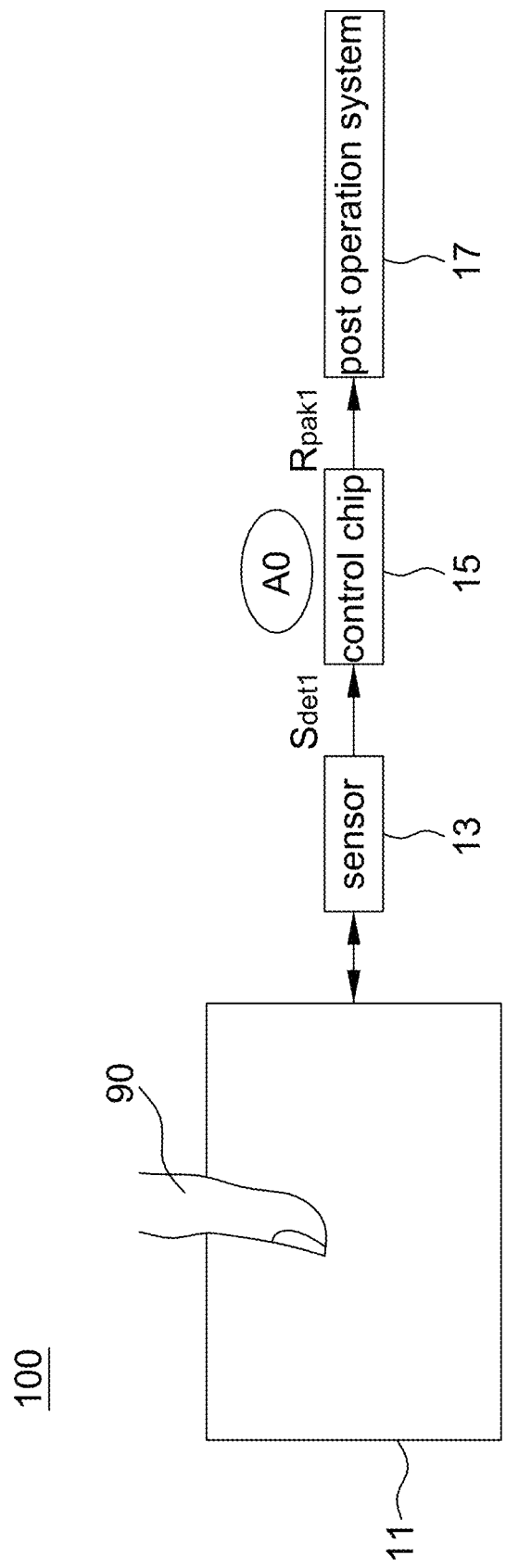
FIG. 1A is a schematic diagram of a first operation type of an electronic device according to one embodiment of the present disclosure.
Figures 1B, 2:
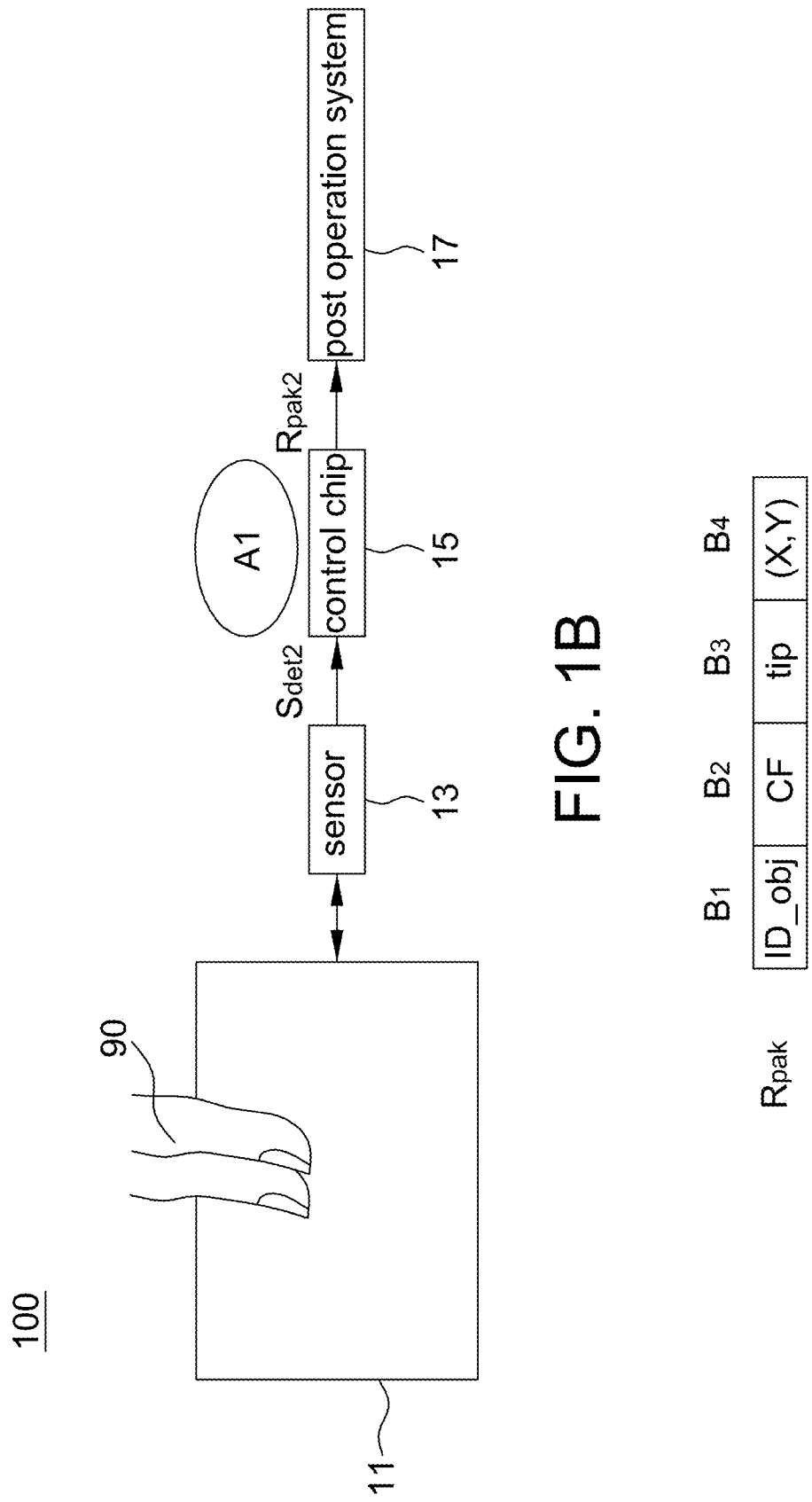
FIG. 1B is a schematic diagram of a second operation type of an electronic device according to one embodiment of the present disclosure.
FIG. 2 is a schematic diagram of a report packet of an electronic device according to one embodiment of the present disclosure.

Please refer to FIGS. 1A and 1B, FIG. 1A is a schematic diagram of a first operation type of an electronic device 100 according to one embodiment of the present disclosure; and FIG. 1B is a schematic diagram of a second operation type of an electronic device 100 according to one embodiment of the present disclosure. The electronic device 100 is, for example, a notebook computer embedded with a touchpad, a tablet computer with an external touchpad or a computer device with a touch screen, but not limited thereto.

The electronic device 100 includes a touch sensing device, a control chip 15 and a post operation device 17. The touch sensing device has a sensing surface for an object 90 to perform touch controls thereon and to output a detection signal. For example, the touch sensing device includes a touchpad 11 and a sensor 13. The touchpad 11 is, for example, a capacitive touch panel, but not limited thereto. The sensor 13 is used to scan the touchpad 11 to output the detection signal (e.g., shown as $S_{det1}$ and $S_{det2}$), e.g., the sensor 13 driving the touchpad 11 and detecting an operating parameter variation of the touchpad 11 (e.g., variations of charging interval or discharging interval of capacitance, voltage variations or current variations, but not limited to), and a result of the operating parameter variation is sent to the control chip 15. The method of a touch sensing device sending the detection signal is known to the art and not a main objective of the present disclosure, and thus details thereof are not described herein.

The control chip 15 has pin(s) to receive the detection signals $S_{det1}$ and $S_{det2}$ from the touch sensing device. The control chip 15 is, for example, embedded with software, hardware and/or firmware, to identify a contact area, an object identity (ID), a contact position, a touch type (or called operation type), and leaving or non-leaving of an object 90 on the touch sensing device according to the detection signals $S_{det1}$ and $S_{det2}$, and sends, using a report rate or a report period, report packets (e.g., shown as $R_{pak1}$ and $R_{pak2}$) to the post operation system 17, e.g., a processor and an operation system of a computer device.

Please refer to FIG. 2, it is a schematic diagram of a report packet $R_{pak}$ of an electronic device 100 according to one embodiment of the present disclosure. The report packet $R_{pak}$ includes at least an object ID code (e.g., shown as ID_obj and indicated by a code $B_1$), a type code (e.g., shown as CF and indicated by a code $B_2$), a tip code (e.g., shown as tip and indicated by a code $B_3$), and a position coordinate (e.g., shown as X, Y and indicated by a code $B_4$). In the present disclosure, the codes $B_1$, $B_2$, $B_3$, $B_4$ include at least one bit, and a number of bits thereof is respectively determined according to a size of data being sent. It should be mentioned that a sequence of the codes is not limited to that shown in FIG. 2.

It is appreciated that the report packet $R_{pak}$ may include other information if required, and is not limited to those mentioned in the present disclosure.

In one aspect, the object ID code is used to indicate an object 90 appearing on a sensing surface of the touch sensing device (or of the touchpad 11). The type code CF is used to indicate a touch type (or operation type) of the object 90, e.g., a first type which is associated with a contact area A0 being smaller than a first area threshold TH1 (referring to FIGS. 1A and 5), and a second type which is associated with a contact area A1 being larger than a second area threshold TH2 (referring to FIGS. 1B and 5), wherein the second type is not limited to a palm operation, and multiple fingers of a user contacting the touchpad 11 is considered as the palm operation as long as the contact area A1 of the multiple fingers is larger than the second area threshold TH2. The tip code is used to indicate whether the object 90 leaves the sensing surface of the touchpad 11 or not. The position coordinate (X,Y) indicates a two-dimensional or one-dimensional position of the object 90 on the sensing surface of the touchpad 11. The method of the control chip 15 identifying the operating parameters (e.g., shown in FIG. 2) included in the report packet $R_{pak}$ according to the detection signals $S_{det1}$ and $S_{det2}$ may use conventional methods, and thus details thereof are not described herein. The present disclosure is to solve the problem of unable to perform the successive operation of "Finger→Palm→Finger" by altering the operating parameters of the report packet $R_{pak}$.

Figures 4C, 5:
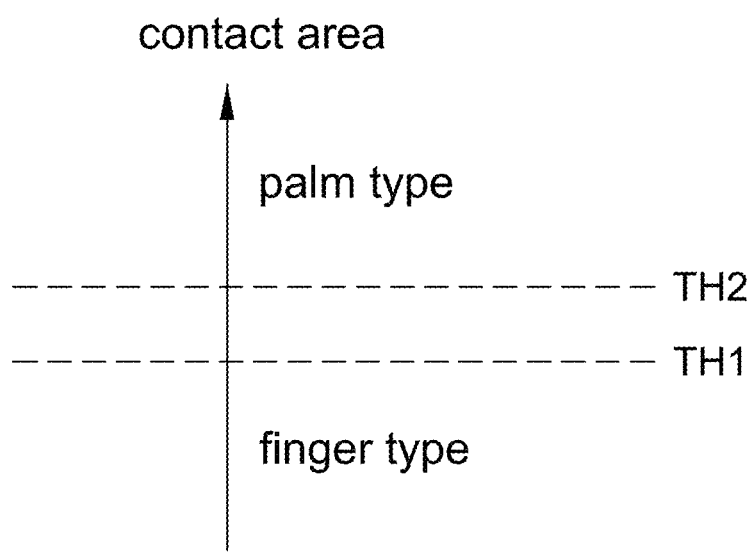
FIG. 4C is further operational schematic diagram of an electronic device according to a second embodiment of the present disclosure.
FIG. 5 is a schematic diagram of determining an operation type according to a contact area by an electronic device according to one embodiment of the present disclosure.

Please refer to FIGS. 3A to 3C, they are operational schematic diagrams of an electronic device 100 according to a first embodiment of the present disclosure. In the first embodiment, the control chip 15 automatically/actively sends a reset report packet in response to the object 90 changing from a first type to a second type. The reset report packet includes a first report packet and a second report packet. The first report packet includes (a first object ID code $B_1$, a leaving tip code $B_3$). The second report packet includes (a second object ID code $B_1$, a non-leaving tip code $B_3$). As mentioned above, the first type is a contact area of the object 90 being smaller than a first area threshold (e.g., A0<TH1 as shown in FIGS. 1A and 5), and the second type is the contact area of the object 90 being larger than a second area threshold (e.g., A1>TH2 as shown in FIGS. 1B and 5). Meanwhile, the object 90 does not leave (i.e. continuously in contact with) the sensing surface of the touch sensing device when the control chip 15 is sending the reset report packet.

In the first embodiment, the first area threshold TH1 is different from the second area threshold TH2 to prevent the repeatedly changing between touch types when the contact area is close to the area threshold. In another aspect, the first area threshold TH1 is set to be identical to the second area threshold TH2, i.e. using a single threshold.

In one aspect, the report packet $R_{pak}$ further includes a position coordinate (e.g., the code $B_4$ as shown in FIG. 2), e.g., shown as (X1, Y1), wherein the (X1, Y1) is a gravity center, a center position or a mass center of a detected object on the sensing surface according to different arrangements.

In one aspect, the report packet $R_{pak}$ further includes a type code (e.g., the code $B_2$ as shown in FIG. 2), e.g., shown as "finger" or "palm" in FIGS. 3A-3B.

Please refer to FIG. 3A, the control chip 15 respectively sends a report packet R0, R1, R1' and R2 at report times $t_0$, $t_1$, $t_2$ and $t_3$.

At the report time $t_0$, the report packet R0 includes a first object ID code "ID_obj1", a type of "finger", a non-leaving code "no" and a position coordinate (X1, Y1) indicating that the control chip 15 detects a finger at the position coordinate (X1, Y1) on the touch sensing device.

At the report time $t_1$, the report packet R1 includes a first object ID code "ID_obj1", a type of "palm", a non-leaving code "no" and a position coordinate (X1, Y1) indicating that the control chip 15 detects a palm at the position coordinate (X1, Y1) on the touch sensing device. Now, the control chip 15 has detected a predetermined type change, i.e., from "finger" at time $t_0$ to "palm" at time $t_1$, and is ready to send a reset report packet.

At the report time $t_2$, the control chip 15 sends a reset report packet R1', which includes a first report packet and a second report packer. The first report packet includes a first object ID code "ID_obj1", a type of "palm", a leaving code "yes" and a position coordinate (X1,Y1). The second report packet includes a second object ID code "ID_obj2", a type of "palm", a non-leaving code "no" and a position coordinate (X1,Y1). That is, the reset report packet R1' indicates a first object "ID_obj1" leaving the sensing surface of the touch sensing device at a type of palm, and a second object "ID_obj2" touching the sensing surface of the touch sensing device at a type of palm, wherein the object 90 on the sensing surface of the touch sensing device is actually not leaving the sensing surface between report times $t_1$ and $t_2$.

At the report time $t_3$, the report packet R2 includes a second object ID code "ID_obj2", a type of "finger", a non-leaving code "no" and a position coordinate (X1,Y1) indicating that the control chip 15 detects a finger at the position coordinate (X1, Y1) on the touch sensing device.

In this way, a successive operation of "Finger→Palm→Finger" by the user is divided into segmented operations of "Finger→Palm" and "Palm→Finger" to be acceptable by the post operation system 17 by adding an additional reset report packet R1'.

That is, in the aspect of FIG. 3A, the control chip 15 identifies the object 90 changing from a first type (i.e. finger) to a second type (i.e. palm) at a first time $t_1$, and sends a reset report packet R1' at a second time $t_2$, which is separated from the first time $t_1$ by a predetermined number of report periods.

Please refer to FIG. 3B, the control chip 15 respectively sends a report packet R0, R1' and R2 at report times $t_0$, $t_1$ and $t_2$. The main difference between the aspects in FIG. 3B and FIG. 3A is that FIG. 3B does not include the report packet R1 shown in FIG. 3A.

Similarly, at the report time to, the report packet R0 includes a first object ID code "ID_obj1", a type of "finger", a non-leaving code "no" and a position coordinate (X1,Y1) indicating that the control chip 15 detects a finger at the position coordinate (X1, Y1) on the touch sensing device.

At the report time $t_1$, the control chip 15 detects a palm at the position coordinate (X1, Y1) on the touch sensing device. Now, the control chip 15 has detected a predetermined type change, i.e., from "finger" at time $t_0$ to "palm" at time $t_1$, and directly sends a reset report packet R1', which includes a first report packet and a second report packer. The first report packet includes a first object ID code "ID_obj1", a type of "palm" (i.e. second type code), a leaving code "yes" and a position coordinate (X1, Y1). The second report packet includes a second object ID code "ID_obj2", a type of "palm" (i.e. second type code), a non-leaving code "no" and a position coordinate (X1, Y1). That is, the reset report packet R1' indicates a first object "ID_obj1" leaving the sensing surface of the touch sensing device at a type of palm, and a second object "ID_obj2" touching the sensing surface of the touch sensing device at a type of palm, wherein the object 90 on the sensing surface of the touch sensing device is actually not leaving the sensing surface at the report time $t_1$.

At the report time $t_2$, the report packet R2 includes a second object ID code "ID_obj2", a type of "finger", a non-leaving code "no" and a position coordinate (X1, Y1) indicating that the control chip 15 detects a finger at the position coordinate (X1, Y1) on the touch sensing device.

In this way, a successive operation of "Finger→Palm→Finger" by the user is divided into segmented operations of "Finger→Palm" and "Palm→Finger" to be acceptable by the post operation system 17 by adding an additional reset report packet R1'.

Please refer to FIG. 3C, the control chip 15 respectively sends a report packet R0, R1' and R2 at report times $t_0$, $t_1$ and $t_2$. The main difference between the aspects in FIG. 3C and FIG. 3B is that FIG. 3C shows a type code $B_2$ in the report packet R1' different from that in FIG. 3B.

Similarly, at the report time to, the report packet R0 includes a first object ID code "ID_obj1", a type of "finger", a non-leaving code "no" and a position coordinate (X1,Y1) indicating that the control chip 15 detects a finger at the position coordinate (X1, Y1) on the touch sensing device.

At the report time $t_1$, the control chip 15 detects a palm at the position coordinate (X1, Y1) on the touch sensing device. Now, the control chip 15 has detected a predetermined type change, i.e., from "finger" at time to to "palm" at time $t_1$, and directly sends a reset report packet R1', which includes a first report packet and a second report packer. The first report packet includes a first object ID code "ID_obj1", a type of "finger" (i.e. first type code), a leaving code "yes" and a position coordinate (X1,Y1). The second report packet includes a second object ID code "ID_obj2", a type of "palm" (i.e. second type code), a non-leaving code "no" and a position coordinate (X1,Y1). That is, the reset report packet R1' indicates a first object "ID_obj1" leaving the sensing surface of the touch sensing device at a type of finger, and a second object "ID_obj2" touching the sensing surface of the touch sensing device at a type of palm, wherein the object 90 on the sensing surface of the touch sensing device is actually not leaving the sensing surface at the report time $t_1$.

At the report time $t_2$, the report packet R2 includes a second object ID code "ID_obj2", a type of "finger", a non-leaving code "no" and a position coordinate (X1, Y1) indicating that the control chip 15 detects a finger at the position coordinate (X1, Y1) on the touch sensing device.

In this way, a successive operation of "Finger→Palm→Finger" by the user is divided into segmented operations of "Finger→Palm" and "Palm→Finger" to be acceptable by the post operation system 17 by adding an additional reset report packet R1'.

That is, in the aspects of FIGS. 3B and 3C, the control chip 15 identifies the object 90 changing from a first type (i.e. finger) to a second type (i.e. palm) at a first time $t_1$, and sends the reset report packet R1' at the first time $t_1$.

It should be mentioned that the first embodiment is described in the way that the first object ID code "ID_obj1" and the second object ID code "ID_obj2" in the reset report packet R1' have the same position coordinate (X1, Y1), but the present disclosure is not limited thereto. In other aspects, the control chip 15 arranges the second object ID code "ID_obj2" to have a position coordinate different from that of the first object ID code "ID_obj1", e.g., at adjacent coordinates of (X1, Y1), but not limited thereto.

It should be mentioned that in the first embodiment, only a time interval between $t_1$ and $t_2$ in FIG. 3A is arranged as a predetermined time interval, e.g., one to three report periods. The occurrence times of other report times (e.g., $t_0$ and $t_3$ in FIG. 3A and $t_0$ to $t_3$ in FIGS. 3B and 3C) are determined according to actual user operations.

Please refer to FIGS. 4A to 4C, they are operational schematic diagrams of an electronic device 100 according to a second embodiment of the present disclosure. In the second embodiment, the control chip 15 sequentially sends a first report packet including (a first object ID code $B_1$, a leaving tip code $B_3$) and a second report packet including (a first object ID code $B_1$, a non-leaving code $B_3$) in response to the object 90 changing from a first type to a second type, i.e. the first report packet and the second report packet of the reset report packet are sent sequentially. As mentioned above, the first type is a contact area of the object 90 being smaller than a first area threshold (e.g., A0<TH1 as shown in FIGS. 1A and 5), and the second type is the contact area of the object 90 being larger than a second area threshold (e.g., A1>TH2 as shown in FIGS. 1B and 5). Meanwhile, the object 90 does not leave (i.e. continuously in contact with) the sensing surface of the touch sensing device when the control chip 15 is sending the first report packet and the second report packet.

In the second embodiment, the first area threshold TH1 is different from the second area threshold TH2 to prevent the repeatedly changing between touch types when the contact area is close to the area threshold. In another aspect, the first area threshold TH1 is set to be identical to the second area threshold TH2, i.e. using a single threshold.

In one aspect, the report packet $R_{pak}$ further includes a position coordinate (e.g., the code $B_4$ as shown in FIG. 2), e.g., shown as (X1, Y1), wherein the (X1, Y1) is a gravity center, a center position or a mass center of a detected object on the sensing surface according to different arrangements.

In one aspect, the report packet $R_{pak}$ further includes a type code (e.g., the code $B_2$ as shown in FIG. 2), e.g., shown as "finger" or "palm" in FIGS. 4A-4B.

Please refer to FIG. 4A, the control chip 15 respectively sends a report packet R0, R1, R1', R1" and R2 at report times $t_0$, $t_1$, $t_2$, $t_3$ and $t_4$.

At the report time to, the report packet R0 includes a first object ID code "ID_obj1", a type of "finger", a non-leaving code "no" and a position coordinate (X1, Y1) indicating that the control chip 15 detects a finger at the position coordinate (X1, Y1) on the touch sensing device.

At the report time $t_1$, the report packet R1 includes a first object ID code "ID_obj1", a type of "palm", a non-leaving code "no" and a position coordinate (X1, Y1) indicating that the control chip 15 detects a palm at the position coordinate (X1,Y1) on the touch sensing device. Now, the control chip 15 has detected a predetermined type change, i.e., from "finger" at time $t_0$ to "palm" at time $t_1$, and is ready to send a reset report packet.

The main difference between the second embodiment and the first embodiment is that the reset report packet (e.g., including the first report packet R1' and a second report packet R1") is not accomplished at the same report time, and the object ID code "ID_obj" is not changed.

At the report time $t_2$, the control chip 15 sends a first report packer R1', which includes a first object ID code "ID_obj1", a type of "palm", a leaving code "yes" and a position coordinate (X1,Y1). That is, the first report packer R1' indicates a first object "ID_obj1" leaving the sensing surface of the touch sensing device at a type of palm.

At the report time $t_3$, the control chip 15 sends a second report packet R1", which includes a first object ID code "ID_obj1", a type of "palm", a non-leaving code "no" and a position coordinate (X1,Y1). That is, the second report packet R1" indicates a first object "ID_obj1" touching the sensing surface of the touch sensing device at a type of palm, wherein the object 90 on the sensing surface of the touch sensing device is actually not leaving between report times $t_1$ and $t_3$.

At the report time $t_4$, the report packet R2 includes a first object ID code "ID_obj1", a type of "finger", a non-leaving code "no" and a position coordinate (X1,Y1) indicating that the control chip 15 detects a finger at the position coordinate (X1, Y1) on the touch sensing device.

In this way, a successive operation of "Finger→Palm→Finger" by the user is divided into segmented operations of "Finger→Palm" and "Palm→Finger" to be acceptable by the post operation system 17 by adding an additional reset report packet R1'.

That is, in the aspect of FIG. 4A, the control chip 15 identifies the object 90 changing from a first type (i.e. finger) to a second type (i.e. palm) at a first time $t_1$, sends a first report packet R1' at a second time $t_2$, and sends a second report packet R1" at a third time $t_3$, wherein the first time $t_1$ and the second time $t_2$ as well as the second time $t_2$ and the third time $t_3$ are separated from each other by a predetermined number of report periods.

Please refer to FIG. 4B, the control chip 15 respectively sends a report packet R0, R1', R1", and R2 at report times $t_0$, $t_1$, $t_2$ and $t_3$. The main difference between the aspects in FIG. 4B and FIG. 4A is that FIG. 4B does not include the report packet R1 shown in FIG. 4A.

Similarly, at the report time to, the report packet R0 includes a first object ID code "ID_obj1", a type of "finger", a non-leaving code "no" and a position coordinate (X1,Y1) indicating that the control chip 15 detects a finger at the position coordinate (X1, Y1) on the touch sensing device.

At the report time $t_1$, the control chip 15 detects a palm at the position coordinate (X1, Y1) on the touch sensing device. Now, the control chip 15 has detected a predetermined type change, i.e., from "finger" at time $t_0$ to "palm" at time $t_1$, and directly sends a first report packet R1' included the in reset report packet, including a first object ID code "ID_obj1", a type of "palm" (i.e. second type code), a leaving code "yes" and a position coordinate (X1, Y1). That is, the first report packet R1' indicates a first object "ID_obj1" leaving the sensing surface of the touch sensing device at a type of palm.

At the report time $t_2$, the control chip 15 sends a second report packet R1" included the in reset report packet, including a first object ID code "ID_obj1", a type of "palm" (i.e. second type code), a non-leaving code "no" and a position coordinate (X1, Y1). That is, the second report packet R1" indicates a first object "ID_obj1" touching the sensing surface of the touch sensing device at a type of palm, wherein the object 90 on the sensing surface of the touch sensing device is actually not leaving between the report times $t_1$ and $t_2$.

At the report time $t_3$, the report packet R2 includes a first object ID code "ID_obj1", a type of "finger", a non-leaving code "no" and a position coordinate (X1,Y1) indicating that the control chip 15 detects a finger at the position coordinate (X1, Y1) on the touch sensing device.

In this way, a successive operation of "Finger→Palm→Finger" by the user is divided into segmented operations of "Finger→Palm" and "Palm→Finger" to be acceptable by the post operation system 17 by adding an additional reset report packet R1'.

Please refer to FIG. 4C, the control chip 15 respectively sends a report packet R0, R1', R1" and R2 at report times $t_0$, $t_1$, $t_2$ and $t_3$. The main difference between the aspects in FIG.

4C and FIG. 4B is that FIG. 4C shows a type code $B_2$ in the report packet R1' different from that in FIG. 4B.

Similarly, at the report time $t_0$, the report packet R0 includes a first object ID code "ID_obj1", a type of "finger", a non-leaving code "no" and a position coordinate (X1,Y1) indicating that the control chip 15 detects a finger at the position coordinate (X1, Y1) on the touch sensing device.

At the report time $t_1$, the control chip 15 detects a palm at the position coordinate (X1, Y1) on the touch sensing device. Now, the control chip 15 has detected a predetermined type change, i.e., from "finger" at time $t_0$ to "palm" at time $t_1$, and directly sends a first report packet R1' included in the reset report packet, including a first object ID code "ID_obj1", a type of "finger" (i.e. first type code), a leaving code "yes" and a position coordinate (X1,Y1). That is, the first report packet R1' indicates a first object "ID_obj1" leaving the sensing surface of the touch sensing device at a type of finger.

At the report time $t_2$, the control chip 15 sends a second report packet R1" included in the reset report packet, including a first object ID code "ID_obj1", a type of "palm" (i.e. second type code), a non-leaving code "no" and a position coordinate (X1,Y1). That is, the second report packet R1" indicates a first object "ID_obj1" touching the sensing surface of the touch sensing device at a type of palm, wherein the object 90 on the sensing surface of the touch sensing device is actually not leaving between the report times $t_1$ and $t_2$.

At the report time $t_3$, the report packet R2 includes a first object ID code "ID_obj1", a type of "finger", a non-leaving code "no" and a position coordinate (X1, Y1) indicating that the control chip 15 detects a finger at the position coordinate (X1, Y1) on the touch sensing device.

In this way, a successive operation of "Finger→Palm→Finger" by the user is divided into segmented operations of "Finger→Palm" and "Palm→Finger" to be acceptable by the post operation system 17 by adding an additional reset report packet R1'.

That is, in the aspects in FIGS. 4B and 4C, the control chip 15 identifies the object 90 changing from a first type (i.e. finger) to a second type (i.e. palm) at a first time $t_1$, sends a first report packet R1' at the first time $t_1$, and sends a second report packet R1" at the second time $t_2$, wherein the first time $t_1$ and the second time $t_2$ are separated by a predetermined number of report periods.

It should be mentioned that the second embodiment is described in the way that the first report packet R1' and the second report packet R1" have the same position coordinate (X1,Y1), but the present disclosure is not limited thereto. In other aspects, the control chip 15 arranges the report packet R1" to have a position coordinate different from that of the first report packet R1', e.g., at adjacent coordinates of (X1, Y1), but not limited thereto.

It should be mentioned that in the second embodiment, only a time interval for sending the reset report packet (e.g., between $t_1$ and $t_2$ and between $t_2$ and $t_3$ in FIG. 4A and between $t_1$ and $t_2$ in FIGS. 4B and 4C) is arranged as a predetermined time interval, e.g., one to three report periods. The occurrence times of other report times are determined according to actual user operations.

As mentioned above, in the first and second embodiments of the present disclosure, the control chip 15 identifies a contact area of an object 90 on a sensing surface of the touch sensing device according to the detection signals $S_{det1}$ and $S_{det2}$, and sends report packets $R_{pak}$ at a report rate. The control chip 15 automatically sends a reset report packet to reset the object 90 as an initial contact (i.e. not changing from a first type) in response to the object 90 changing from a first type (e.g., finger) to a second type (e.g., palm). The first report packet includes at least a leaving tip code (i.e. the code $B_3$ being a digital value indicating leaving state, e.g., "0", but not limited to). The second report packet includes at least a non-leaving tip code (i.e. the code $B_3$ being a digital value indicating non-leaving state, e.g., "1", but not limited to), In some aspects, the first report packet further includes a first position coordinate of the sensing surface, the second report packet further includes a second position coordinate of the sensing surface, and the first position coordinate is identical to or different from the second position coordinate.

In some aspects, the first report packet further includes a first object ID code, the second report packet further includes a second object ID code, and the second object ID code is identical to or different from the first object ID code. For example, in FIGS. 3A to 3C, the second object ID code is different from the first object ID code; whereas, in FIGS. 4A to 4C, the second object ID code is identical to the first object ID code.

In some aspects, the first report packet further includes a first type code, the second report packet further includes a second type code, and the first type code is identical to or different from the second type code. For example, in FIGS. 3A to 3B and FIGS. 4A to 4B, the second type code is identical to the first type code; whereas, in FIGS. 3C and 4C, the second type code is different from the first type code.

In some aspects, the control chip 15 sends the first report packet and the second report packet at an identical report time or at different report times. For example, in FIGS. 3A to 3C, the control chip 15 sends the first report packet and the second report packet at the same report time; whereas, in FIGS. 4A to 4C, the control chip 15 sequentially sends the first report packet and the second report packet at different report times.

In some aspects, the control chip 15 identifies an object 90 changing from a first type to a second type at a first report time, and sends a first report packet at the first report time or at a report time behind the first report time. For example, in FIGS. 3B to 3C and FIGS. 4B to 4C, the control chip 15 sends a first report packet at the first report time; whereas, in FIGS. 3A and 4A, the control chip 15 sends a first report packet and a second report packet at report times behind the first report time.

In the present disclosure, the post operation system 17 performs a corresponding control according to the report packet $R_{pak}$ (e.g., referring to FIG. 2) sending from the control chip 15. For example, when the report packet $R_{pak}$ includes a code $B_2$ indicating a first type (e.g., finger) and a code $B_3$ indicating non-leaving, the post operation system 17 controls the movement of a cursor on a display screen according to the position coordinate code $B_4$, but not limited to; whereas, when the report packet $R_{pak}$ includes a code $B_2$ indicating a second type (e.g., palm) and a code $B_3$ indicating non-leaving, the post operation system 17 controls the screen scrolling operation and zooming operations (cursor not moving) according to the position coordinate code $B_4$, but not limited to. The corresponding control of the post operation system 17 according to the report packet $R_{pak}$ is previously embedded in the post operation system 17 according to different requirements.

In a further aspect, as long as the control chip 15 identifies, for the first time, the object 90 on a sensing surface of a touchpad 11 has a second type (including the object 90 being identified as the first type before being identified as the second type, and no object on the sensing surface of a touchpad 11 being identified before the object 90 is identified as the second type), the control chip 15 automatically sends a reset report packet indicating that the object 90 leaves the sensing surface and a second object having the second type touches (non-leaving) the sensing surface, e.g., referring to the report packet R1' shown in FIGS. 3A and 3B and the report packet R1' and R1" shown in FIGS. 4A and 4B.

That is, the present disclosure is not limited to that the first type must be identified previous to the second type.

In one aspect, the second object is the same object as the object 90, i.e. the object 90 actually not leaving the sensing surface when the control chip 15 indicates leaving status. In one aspect, an object ID of the object 90 before and after being identified as the second type for the first time is changed (e.g., referring to FIGS. 3A and 3B) or not changed (e.g., referring to FIGS. 4A and 4B). The definitions of the first type and the second type have been described above, and thus details thereof are not repeated herein.

It should be mentioned that although the drawings of the present disclosure show the finger operation and the palm operation respectively using a single finger and two fingers as examples, the present disclosure is not limited thereto. Any object may be used as the object 90 of the present disclosure as long as the object is detectable by the touch sensing device of the present disclosure.

It should be mentioned that although the drawings of the present disclosure show the touch sensing device by a touchpad 11 as an example, the present disclosure is not limited thereto. In another aspect, the touch sensing device of the present disclosure is combined to a display screen to form a touch sensor display.

As mentioned above, because the precision touchpad of Microsoft Corporation currently cannot accept a successive operation of "Finger→Palm→Finger", a user may need to repeatedly take off and put on his/her palm during operating the precision touchpad. Accordingly, the present disclosure further provides an electronic device that automatically resets an operating status as firstly leaving and then touching again (e.g., FIGS. 3A-3C and 4A-4C) that may prevent a type change of "Finger→Palm" from unintentionally occurring to cause the operation of "Palm→Finger" to be unacceptable. In this way, the user needs not to frequently take off an operating object (e.g., palm) from a sensing surface to effectively improve the user experience.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An electronic device, comprising:
a control chip, configured to
receive a detection signal,
identify a first type and a second type of an object on a sensing surface of a touch sensing device according to the detection signal, and send report packets at a report period, and
automatically send a reset report packet in response to the object changing from the first type to the second type, the reset report packet comprising a first report packet and a second report packet, the first report packet comprising (a first object ID code, a leaving tip code), and the second report packet comprising (a second object ID code, a non-leaving tip code),
wherein the object does not leave the sensing surface of the touch sensing device when the control chip is sending the reset report packet,
the first type is a contact area of the object on the sensing surface being smaller than a first area threshold, and the second type is the contact area being larger than a second area threshold, and
the first area threshold is different from the second area threshold.

2. The electronic device as claimed in claim 1, wherein the first report packet further comprises a first position coordinate of the sensing surface,
the second report packet further comprises a second position coordinate of the sensing surface, and
the first position coordinate is identical to the second position coordinate.

3. The electronic device as claimed in claim 1, wherein the control chip is configured to
identify the object changing from the first type to the second type at a first time, and
send the reset report packet at a second time, which is separated from the first time by a predetermined number of report periods.

4. The electronic device as claimed in claim 1, wherein the control chip is configured to
identify the object changing from the first type to the second type at a first time, and
send the reset report packet at the first time.

5. The electronic device as claimed in claim 4, wherein the first report packet further comprises a second type code and the second report packet further comprises the second type code.

6. The electronic device as claimed in claim 4, wherein the first report packet further comprises a first type code and the second report packet further comprises a second type code.

7. An electronic device, comprising:
a control chip, configured to
receive a detection signal,
identify a first type and a second type of an object on a sensing surface of a touch sensing device according to the detection signal, and send report packets at a report period, and
automatically send a reset report packet when the object is identified as the second type for the first time, wherein the reset report packet indicates that the object leaves the sensing surface and a second object having the second type touches the sensing surface,
wherein the object does not leave the sensing surface of the touch sensing device when the control chip is sending the reset report packet, and
the first type is a contact area of the object on the sensing surface being smaller than a first area threshold, and the second type is the contact area being larger than a second area threshold.

8. The electronic device as claimed in claim 7, wherein an object ID code of the object before and after being identified as the second type for the first time is changed or not changed.

9. The electronic device as claimed in claim 8, wherein the object having the object ID code is identified as the first type by the control chip before being identified as the second type for the first time.

10. The electronic device as claimed in claim 7, wherein the first area threshold is different from the second area threshold.

11. The electronic device as claimed in claim 7, wherein the second object is the same object as the object.

12. The electronic device as claimed in claim 7, wherein the reset report packet comprises a position coordinate of the sensing surface, and the position coordinates of the object and the second object are identical.

13. An electronic device, comprising:
a control chip, configured to
receive a detection signal,
identify a first type and a second type of an object on a sensing surface of a touch sensing device according to the detection signal, and send report packets at a report rate, and
automatically send a reset report packet to reset the object as an initial contact in response to the object changing from the first type to the second type, the reset report packet comprising a first report packet and a second report packet, the first report packet comprising a leaving tip code, and the second report packet comprising a non-leaving tip code,
wherein the object does not leave the sensing surface of the touch sensing device when the control chip is sending the reset report packet,
the first report packet further comprises a first position coordinate of the sensing surface,
the second report packet further comprises a second position coordinate of the sensing surface, and
the first position coordinate is identical to or different from the second position coordinate.

14. The electronic device as claimed in claim 13, wherein
the first report packet further comprises a first object ID code,
the second report packet further comprises a second object ID code, and
the second object ID code is identical to or different from the first object ID code.

15. The electronic device as claimed in claim 13, wherein
the first report packet further comprises a first type code,
the second report packet further comprises a second type code, and
the second type code is identical to or different from the first type code.

16. The electronic device as claimed in claim 13, wherein the control chip is configured to send the first report packet and the second report packet at an identical report time or at different report times.

17. The electronic device as claimed in claim 13, wherein the control chip is configured to
the first type is a contact area of the object on the sensing surface being smaller than a first area threshold, and the second type is the contact area being larger than a second area threshold,
identify the object changing from the first type to the second type at a first report time, and
send the first report packet at the first report time or at a report time behind the first report time.

\* \* \* \* \*